May 6, 1952      J. C. LUNSFORD      2,595,865
DOUGHNUT FORMING MACHINE
Filed Feb. 19, 1946      2 SHEETS—SHEET 1
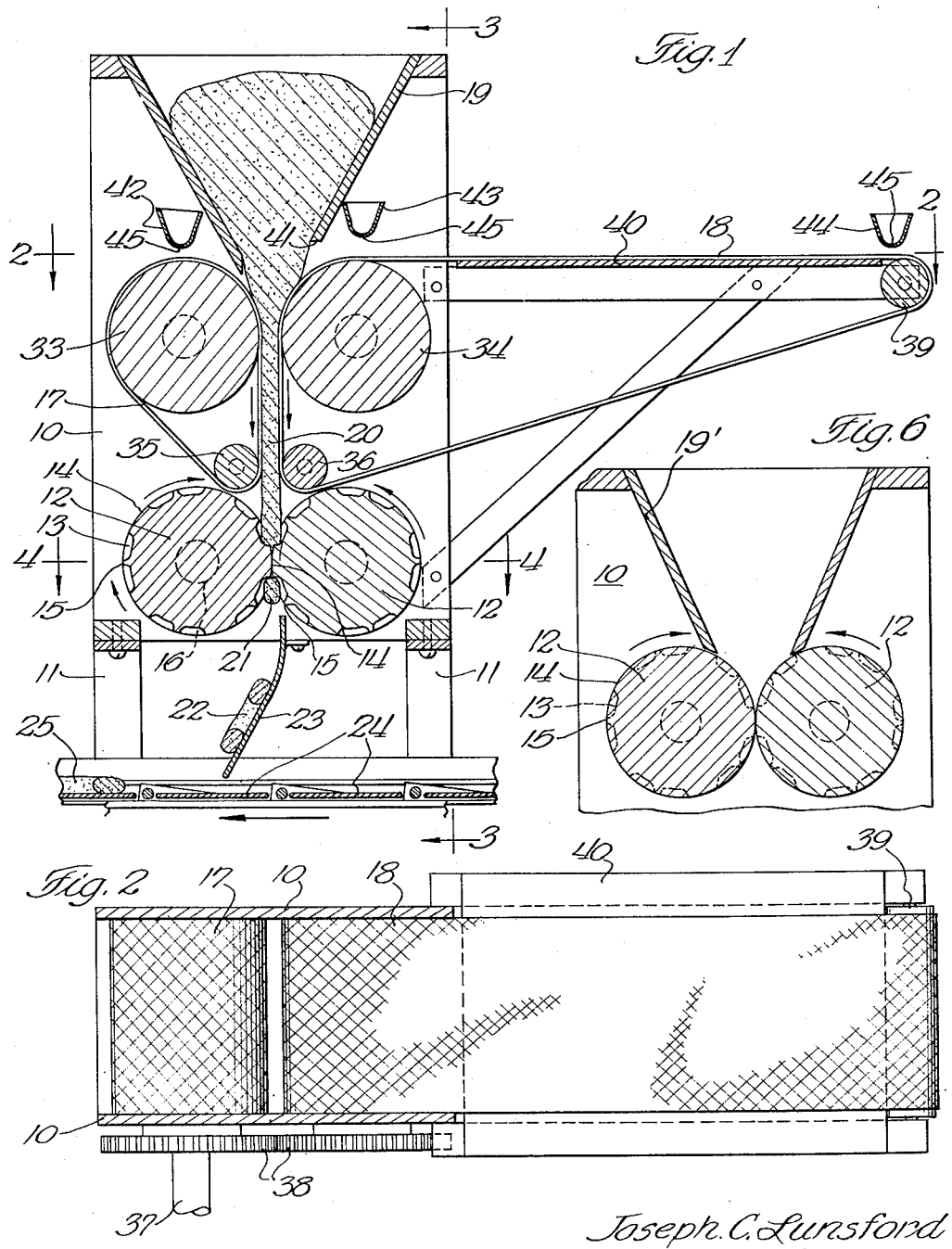
Joseph C. Lunsford
INVENTOR
BY
ATTORNEY May 6, 1952 J. C. LUNSFORD 2,595,865
DOUGHNUT FORMING MACHINE
Filed Feb. 19, 1946 2 SHEETS—SHEET 2
Fig. 3
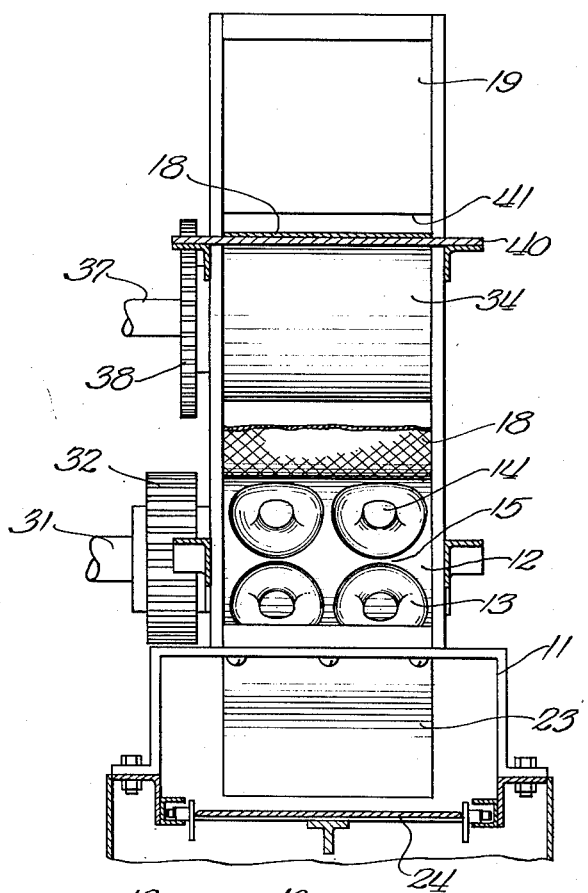
Fig. 5
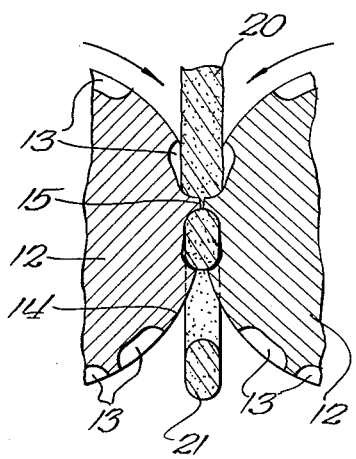
Fig. 4
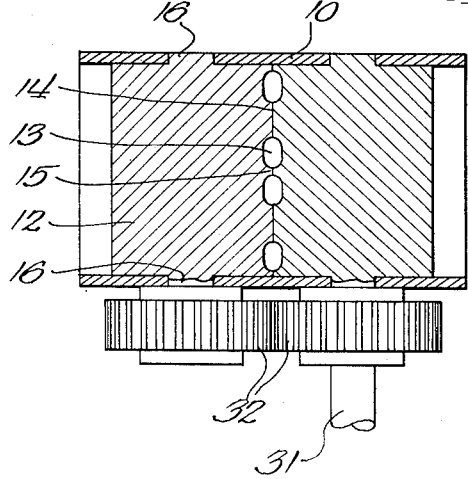
Joseph C. Lunsford
INVENTOR
ATTORNEY Patented May 6, 1952

2,595,865

UNITED STATES PATENT OFFICE 2,595,865

DOUGHNUT FORMING MACHINE

Joseph C. Lunsford, Portland, Oreg., assignor to
H. C. Rhodes, Portland, Oreg.

Application February 19, 1946, Serial No. 648,712

4 Claims. (Cl. 107—8)

This invention relates to a novel machine for forming doughnuts and other comestibles from the raw dough.

Completely automatic machines have heretofore been successfully operated for making cake doughnuts where the only manual attention required is the filling of a hopper with the dough or batter and the packaging of the finished doughnuts. In making doughnuts with the baking powder batter used for cake doughnuts, the manner in which the doughnut is cut or formed does not appear to be critical, as it is immediately dropped into the cooking oil to start the cooking operation. The rising of such doughnuts is very limited and proceeds satisfactorily to the required extent as the doughnut is being cooked. The manufacture of this type of doughnuts presents no critical problems and is carried out in production routine quite satisfactorily by relatively unskilled operators using automatic machinery. Such machines are also used for making a type of doughnuts which are sometimes represented as being raised doughnuts but which are not truly raised doughnuts in the sense that a baker uses this term to distinguish between raised and cake doughnuts.

On the other hand, doughnuts which are properly classified as raised doughnuts have heretofore been cut in one operation from a sheet of dough which has been rolled in a preceding independent operation, the cutting operation being performed by a sharp edged tool or die in the nature of a cooky cutter. The dough for such doughnuts contains yeast as a leavening agent, and no baking powder, and after the doughnuts are cut they must be allowed to stand for a time in a warm proofing chamber to allow the yeast to work before the cooking operation. The raw dough charges thus begin to rise in the proofing chamber under the relatively slow action of the yeast, and after this action has preceded to an intermediate stage, the partially raised doughnuts are dropped into cooking oil to further raise and to cook the dough. The cooking operation itself for raised doughnuts is very similar to the cooking operation for cake doughnuts, except that a slightly longer time and higher temperature are ordinarily required. A yeast raised doughnut made in this manner, however, is readily distinguishable in the trade from a cake doughnut made with baking powder and dropped immediately into the cooking oil without proofing. Even if the leaven for such cake doughnuts includes a small amount of yeast to improve the quality, the product is still nevertheless a separate and distinct article of manufacture from true raised doughnuts containing only yeast as a leaven and which have been proofed before cooking.

Experience indicates that the rolling of the dough is essential to produce the proper action of the yeast to raise the doughnut, and it is believed that this fact accounts for the absence of any successful prior machine for forming raised doughnuts in a single operation comparable to the forming of cake doughnuts. All attempts to make raised doughnuts in cake doughnut machines have failed because the processes carried out by cake doughnut machines interfere in some way with the action of the yeast, and the products of such machines have always been very inferior. In the machine of the present invention, applicant provides mechanical parts to roll the dough and form doughnuts therefrom simultaneously in a single operation in such a manner that the yeast will react in the proofing chamber in the same manner as in hand rolled and hand cut doughnuts. In one embodiment of the present machine, the dough mix is fed into a hopper and subjected only to the rolling action of doughnut forming rolls, and in another embodiment there is also provision for receiving sheeted dough which has already been hand or machine rolled. In either case the present machine forms doughnuts from yeast rising dough automatically without producing any waste which must be reworked.

It is accordingly the general object of the invention to provide an improved machine which will operate successfully in forming raised doughnuts and the like from yeast leavened dough without hindering or retarding the proofing operation.

A primary object is to provide a machine for rolling dough and forming doughnuts and the like therefrom in a single operation.

Another object is to provide a doughnut machine having means to roll the dough in the manner of a rolling pin and at the same time in the same operation form the individual doughnuts in the general manner of a conventional hand doughnut cutter to produce raised yeast doughnuts equal in quality to the hand made product.

A further object is to provide a novel machine which will operate continuously and automatically to form dough products of specified shapes without waste or trimmings.

A further object is to provide a forming machine having means for receiving loose dough directly from a hopper or for receiving sheeted dough which has been previously rolled.

These and other objects of the invention are attained in the preferred embodiments illustrated in the accompanying drawings and described in the annexed detailed specification, it being understood that these embodiments are to be taken as merely illustrative of the principles of the invention and not in a limiting sense. Various changes may be made in the construction and arrangement of parts, and all such modifications within the scope of the appended claims are included in the invention.

In the drawings:

Figure 1 is a vertical sectional view through a doughnut forming machine embodying the principles of the present invention in an arrangement adapted to handle either loose dough or sheeted dough.

Figure 2 is a plan view taken on the line 2—2 of Figure 1;

Figure 3 is an elevation view taken on the line 3—3 of Figure 1;

Figure 4 is a sectional view taken on the line 4—4 of Figure 1;

Figure 5 is an enlarged fragmentary sectional view through the doughnut forming rolls showing the action on the dough after the rolls have rotated slightly from the position shown in Figure 1; and Figure 6 is a vertical sectional view of a simplified construction.

In the forming machine shown in Figure 1 the numeral 10 designates a frame supported upon legs or standards 11 for carrying the operating parts of the mechanism. The numerals 12 designate forming rolls of metal or other material having complementary depressions or cavities 13 corresponding to the shape of the product to be produced, these cavities by way of illustration being of doughnut shape, and cylindrical surface areas 14 and 15 within and around these cavities. For forming doughnuts the surface area 14 is of circular configuration disposed centrally within each of the doughnut cavities, and the surface area 15 comprises the generally cylindrical surface of the roll 12 around the doughnut cavities. The rolls 12 have trunnions 16 rotatably mounted in the frame 10 for mutual rolling contact of their cylindrical surfaces, as shown in Figures 1, 4, and 5. It is preferable to make the rolls easily removable in order to substitute other rolls for making maple bars, bear claws, and the like.

Dough is fed into the rolls 12 from between a pair of belts 17 and 18 traveling downwardly in a vertical direction beneath a trough shaped dough hopper 19. The spacing of the belts is such that the dough from the hopper is rolled into a sheet 20 having a thickness approximately twice the depth of the doughnut cavity 13 in each roll so as to fill these complementary volumes as the rolls rotate to enclose the dough sheet. In Figure 1 the numeral 21 designates one side of a doughnut charge which has already been formed and cut off by the mutual cupping action of the inwardly rotating rolls. Further rotation of the rolls in the direction of the arrows will complete this doughnut charge and sever it from the dough sheet 20 to release it in the manner of the doughnut charge 22 which is shown sliding down the inclined plate 23 onto a conveyor tray 24 moving in the direction indicated. The numeral 25 indicates a doughnut charge which has been formed just previous to the doughnut charge 22 and which is now being carried by the conveyor into a proofing chamber. The speed of the conveyor is coordinated with the speed of the doughnut forming machine so as to bring the trays 24 into loading position at the proper times to receive the doughnut charges as they are discharged from the forming rolls.

The rolls 12 are driven by a shaft 31 connected with a source of power, one roll being driven from the other by means of gears 32 to maintain correct registry of the doughnut cavities on the two rolls. The vertical reaches of the belts 17 and 18 are positioned in parallel, spaced relation by a pair of large rollers 33 and 34 directly beneath the bottom outlet of the hopper 19, and a pair of small rollers 35 and 36 immediately above the nip of the forming rolls 12. Power for driving the belts is obtained from a shaft 37 on the roller 33, the roller 34 being driven thereby through a pair of meshing gears 38. The speed of the belts 17 and 18 is coordinated with the forming rolls 12 by means of external driving connections, and suitable means may be included for varying the speed of the belts while the machine is operating to adjust the feed rate in accordance with the output of the forming rolls.

It will be observed in Figure 1 that the belt 18 is trained around a small roller 39 at the outer end of a horizontal table 40 on a level with the top side of the roller 34, and that one side of the hopper 19 has a lower edge 41 spaced somewhat above the roll 34. The horizontal reach of the belt 18 on the table 40 provides means for feeding sheeted dough into the machine from the side, beneath the lower edge 41 of the hopper. If preliminary hand working or rolling is desirable with a particular dough mix, this may be done directly on an extension of the table 40 at one side of the belt 18 or on a table adjacent the table 40. Such hand rolling is then supplemented by the rolling action of the various pairs of rolls in the machine.

Associated with the belts 17 and 18 are flour sifters 42, 43, and 44, one of the purposes of the belt feed being to provide means for flouring the dough before it enters between the forming rolls 12. Some dough mixes will work satisfactorily in the forming rolls without flouring, but the embodiment of Figure 1 makes provision for handling doughs which would tend to stick to the rolls if not floured. Each of the sifters comprises essentially a trough having perforations or slits 45 and the bottom and agitator means cooperating therewith to brush a small amount of flour therethrough when the machine is operating. Flour thus discharged through the openings 45 falls on the belts and coats the dough surface to prevent its adhesion both to the belts and to the forming rolls. When dough is being fed from the hopper, the agitator in the sifter 44 may be rendered inoperative so that flour will be distributed only by the two sifters 42 and 43. When dough is fed from the horizontal belt 18, the sifter 43 is rendered inoperative and then flour is distributed by the sifters 42 and 44.

In the embodiment of Figure 1 the principal rolling action on the dough occurs in the rolls 12 simultaneously with the forming of the dough products or charges to be proofed, but of course the rollers 33 and 34, and the rollers 35 and 36, also exert a rolling action which may be considered as a rolling stage, or stages, preliminary to the principal rolling stage. The rollers 33 to 36 and the belts 17 and 18 therefore primarily constitute a feeding means and flouring means, and secondarily a rolling means.

For dough mixes which are to be fed exclusively from a hopper, and which will feed satisfactorily through the forming rolls without flouring, the machine may be simplified as shown in Figure 6. In this embodiment the dough feeds by gravity directly from the hopper 19' into the forming rolls 12 without auxiliary flouring and feeding means. The entire rolling action is then accomplished in one stage as the products are formed. The hopper is of trough shape wherein the sides converge and approach almost into contact with the upper sides of the rolls.

The forming action of the rolls 12 is shown on a larger scale in Figure 5. Here the rolls have rotated beyond the position shown in Figure 1 to advance the completed side 21 of a doughnut charge clear of the rolls, and substantially to complete the forming of the trailing side of the doughnut. It will be seen that the approaching surfaces 15 are about to pinch off and sever the completed doughnut charge from the dough sheet 20 which is already filling the next pair of complementary cavities 13. This action is the same regardless of whether the dough is fed in a sheet between belts, or fed by gravity directly from a hopper. The mutual separation of the complementary cavities 13 as they travel in their own divergent circular paths pulls them away from the material of the doughnut so as to leave the latter perfectly formed without tendency to wrap around the rolls or to tear apart. The rolls are mounted so that the cylindrical surfaces 14 and 15 on the two rolls meet precisely in a line contact which is sufficiently tight to prevent the inclusion of any dough therebetween, the smoothness of these surfaces causing the dough to slide thereover without entering in the nip of the rolls until the next pair of cavities present themselves.

The rolling action produces a stretching of the dough which results in a certain amount of shrinkage in one direction after the dough charges leave the forming rolls. In the case of doughnuts, if the cavities 13 are circular, the dough is stretched by rolling to fill these cavities and when the charges are released from the rolls they tend to shrink back to an elliptical shape which will then be their final shape after cooking. If this change of shape is objectionable the cavities may be elongated, or distorted, in the direction of rotation to compensate for shrinkage so that the product will ultimately assume the shape desired. However, the amount of shrinkage varies with different dough mixes, depending upon the formulation and stiffness of the dough, and dough mixes may be used which exhibit little or no shrinkage.

When the rolls 12 are designed to form two dough charges at a time, as shown in Figure 3, there will be a central track and two marginal tracks of narrow width where the surface 15 is continuous around the rolls beyond and between the outer boundaries of the cavities 13. In such paths the dough slides in the angle between the rolls without entering the nip, while adjacent dough moves into the cavities 13 as they come along. In practice, the action is such that no trimmings or waste are discharged from the machine, the dough being effectively retained in the groove between the converging top sides of the rolls until it is forced sooner or later into one of the cavities 13 to form a part of a complete dough charge, the only discharge being completely formed dough charges of the desired shape. The present forming machine thereby overcomes one troublesome problem which has heretofore been considered unavoidable in the making of raised doughnuts. This is the problem of utilizing the scrap dough after doughnuts have been cut from a sheet. Such dough scraps are ordinarily somewhat re-worked and re-rolled and then re-cut, with the result that the yeast action in the proofing chamber is different and the cooking action in the cooker is different on the scrap dough from the rest of the doughnuts in the batch. In the present machine the elimination of scrap eliminates re-working and re-rolling, and all of the doughnuts from the first to the last in a particular dough mix react uniformly, both in the proofing chamber and in the cooking machine. This advantage in itself greatly simplifies the making of raised doughnuts by making it easier to coordinate the speeds of the various mechanisms with the proofing time and the cooking time and temperature to produce a machine made product of uniform high quality.

The present mechanism is, of course, not necessarily limited to the cutting and forming of doughnuts; and applicant does not wish to be limited to this particular product, nor to the use of yeast rising dough. The present mechanism is of peculiar advantage in handling yeast rising dough for such products as raised doughnuts, maple bars, bear claws and the like, for the reasons hereinabove pointed out, but it also possesses features and advantages for use with other products and other kinds of doughs, as will be apparent to persons skilled in the art.

Having now described my invention and in what manner the same may be used, what I claim as new and desire to protect by Letters Patent is:

1. In a dough product forming machine, a pair of spaced parallel downwardly traveling belts for conveying dough in a sheet between the belts, a plurality of vertically spaced pairs of parallel horizontal rolls supporting said belts in said spaced parallel relation, the rolls of each pair being directly opposite each other on opposite sides of the dough sheet and belts to work the dough repeatedly as it is conveyed by the belts between the rolls of each pair in succession, said belts being trained around the uppermost rolls to converge downwardly into the nip of the rolls, a loose dough hopper having a sloping bottom wall with a bottom edge closely approaching the belt on one of said uppermost rolls to guide dough from the hopper into the nip of the uppermost rolls, a horizontal reach on the other belt for receiving sheeted dough, and a sloping bottom wall on said hopper opposite said first wall and having a bottom edge spaced above said other belt to allow sheeted dough on said horizontal reach to pass under said edge to enter the nip of the rolls.

2. In a dough product forming machine, a pair of spaced parallel vertical belts for conveying dough in a sheet downwardly between the belts, upper and lower pairs of parallel horizontal rolls supporting said belts, the rolls of each pair being directly opposite each other on opposite sides of the dough sheet and belts to work the dough repeatedly as it is conveyed by the belts between the rolls of each pair in succession, said belts being trained around the upper rolls to converge downwardly into the nip of the rolls, a loose dough hopper having a pair of oppositely sloping bottom walls converging toward the nip of the upper pair of rolls, one of said walls having a bottom edge closely adjacent one of said upper rolls and the other wall having a bottom edge spaced above the other upper roll, a table adjacent said other roll, and a horizontal reach on the belt on said other roll extending from said other roll across said table to feed sheeted dough under said spaced bottom edge.

3. In a dough product forming machine, a pair of forming rolls having cavities to form said product, a pair of spaced parallel downwardly traveling belts parallel with said forming rolls arranged to convey a sheet of dough between the belts to said forming rolls, a plurality of pairs of spaced belt rollers parallel with said forming rolls supporting said belts in said spaced parallel relation, the rollers of each pair being directly opposite each other on opposite sides of the dough sheet and belts to work the dough repeatedly as it is conveyed by the belts between the rollers of each pair in succession, said belts being trained around the rollers of the uppermost pair to converge downwardly into the nip of said rollers, and a hopper having downwardly sloping converging walls parallel with said rollers defining a discharge opening immediately above the nip of said uppermost rollers to feed dough between said converging portions of the belts.

4. In a dough product forming machine, a pair of forming rolls having cavities to form said product, a pair of spaced parallel downwardly traveling belts parallel with said forming rolls arranged to convey a sheet of dough between the belts to said forming rolls, a plurality of pairs of spaced belt rollers parallel with said forming rolls supporting said belts in said spaced parallel relation, the rollers of each pair being directly opposite each other on opposite sides of the dough sheet and belts to work the dough repeatedly as it is conveyed by the belts between the rollers of each pair in succession, said belts being trained around the rollers of the uppermost pair to converge downwardly into the nip of said rollers, a hopper having downwardly sloping converging walls parallel with said rollers defining a discharge opening immediately above the nip of said uppermost rollers to feed dough between said converging portions of the belts, one of said belts having a horizontal reach approaching its said uppermost roll, and one of said hopper walls having a lower end spaced a distance above the converging portion of said one belt to provide clearance for the feeding of dough beneath said hopper wall from said horizontal reach.

JOSEPH C. LUNSFORD.

REFERENCES CITED

The following references are of record in the file of this patent:

UNITED STATES PATENTS

| Number | Name | Date |
|---|---|---|
| 215,006 | Lampert et al. | May 6, 1879 |
| 363,195 | Barker | May 17, 1887 |
| 379,871 | Hoops | Mar. 20, 1888 |
| 870,249 | Patterson | Nov. 5, 1907 |
| 912,695 | Loesch et al. | Feb. 16, 1909 |
| 1,270,096 | Baker | June 18, 1918 |
| 1,340,805 | Thomson | May 18, 1920 |
| 1,482,195 | Kern et al. | Jan. 29, 1924 |
| 1,608,708 | Miles | Nov. 30, 1926 |
| 1,844,142 | Barili | Feb. 9, 1932 |
| 1,882,160 | Paris | Oct. 11, 1932 |
| 1,949,835 | James et al. | Mar. 6, 1934 |
| 2,063,750 | Parsons | Dec. 8, 1936 |
| 2,208,905 | Kremmling et al. | July 23, 1940 |
| 2,227,728 | Lombi | Jan. 7, 1941 |

FOREIGN PATENTS

| Number | Country | Date |
|---|---|---|
| 7,217 | Great Britain | Sept. 25, 1906 |
| 169,322 | Great Britain | Sept. 29, 1921 |
| 624,683 | France | Apr. 11, 1927 |